(12) United States Patent
Mizoguchi et al.

(10) Patent No.: US 12,091,014 B2
(45) Date of Patent: Sep. 17, 2024

(54) DECELERATION CONTROL OF VEHICLE FOR AVOIDING OBSTACLE

(71) Applicant: SUBARU CORPORATION, Tokyo (JP)

(72) Inventors: Masato Mizoguchi, Tokyo (JP); Ryosuke Namba, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 585 days.

(21) Appl. No.: 17/329,720

(22) Filed: May 25, 2021

(65) Prior Publication Data

US 2022/0009493 A1 Jan. 13, 2022

(30) Foreign Application Priority Data

Jul. 7, 2020 (JP) .................... 2020-117366

(51) Int. Cl.
*B60W 30/09* (2012.01)
*B60W 30/18* (2012.01)
(Continued)

(52) U.S. Cl.
CPC ...... *B60W 30/18163* (2013.01); *B60W 30/09* (2013.01); *B60W 40/105* (2013.01);
(Continued)

(58) Field of Classification Search
CPC .......... B60W 30/18163; B60W 30/09; B60W 40/105; B60W 2554/4049; B60W 2554/802; B60W 2556/65; B60W 30/0953; B60W 30/0956; B60W 2552/00; B60W 2554/4042; B60W 2554/804; B60W 2556/45; B60W 2720/10; G06V 20/58

See application file for complete search history.

(56) References Cited

U.S. PATENT DOCUMENTS

| 2018/0039268 A1* | 2/2018 | Mangal ............. B60W 60/0059 |
| 2018/0093676 A1* | 4/2018 | Emura ................ B60W 50/082 |

(Continued)

FOREIGN PATENT DOCUMENTS

| JP | 2001101599 A | * | 4/2001 |
| JP | 2019-172113 A |   | 10/2019 |

*Primary Examiner* — Daniel M. Robert
(74) *Attorney, Agent, or Firm* — Rimon P.C.

(57) ABSTRACT

A travel control device includes a first recognizer recognizing first travel environment information based on information acquired by an autonomous sensor, a second recognizer recognizing second travel environment information acquired by external communication, a main deceleration controller performing main deceleration control against an obstacle when it is determined, based on the first information, that the vehicle is traveling on a branch road merging with a main road and an obstacle may interfere with the vehicle at a merging point with the main road at a predicted time, and a preliminary deceleration controller performing preliminary deceleration control against the obstacle before the main deceleration control when it is determined, based on the second information, that the vehicle is traveling on the branch road, and the obstacle is to exist at the merging point at the predicted time and the obstacle is not recognized yet based on the first information.

5 Claims, 9 Drawing Sheets

(51) Int. Cl.
  *B60W 40/105* (2012.01)
  *G06V 20/58* (2022.01)
(52) U.S. Cl.
  CPC ..... *G06V 20/58* (2022.01); *B60W 2554/4049* (2020.02); *B60W 2554/802* (2020.02); *B60W 2556/65* (2020.02)

(56) References Cited

U.S. PATENT DOCUMENTS

| | | | | |
|---|---|---|---|---|
| 2019/0071074 | A1* | 3/2019 | Gokan | G01S 13/723 |
| 2019/0146519 | A1* | 5/2019 | Miura | G06V 40/103 |
| | | | | 701/28 |
| 2019/0184990 | A1* | 6/2019 | Lee | B60W 30/143 |
| 2019/0272744 | A1* | 9/2019 | Suzuki | G08G 1/096758 |
| 2019/0351898 | A1* | 11/2019 | Kondo | B62D 6/00 |
| 2020/0180636 | A1* | 6/2020 | Oh | B60Q 1/346 |
| 2020/0269864 | A1* | 8/2020 | Zhang | G05D 1/0088 |
| 2021/0046928 | A1* | 2/2021 | Ohmura | B60W 50/12 |

* cited by examiner

DECELERATION CONTROL OF VEHICLE FOR AVOIDING OBSTACLE

CROSS-REFERENCE TO RELATED APPLICATIONS

The present application claims priority from Japanese Patent Application No. 2020-117366 filed on Jul. 7, 2020, the entire contents of which are hereby incorporated by reference.

BACKGROUND

The disclosure relates to vehicle travel control devices capable of controlling the vehicle speed of subject vehicles in accordance with, for example, travel environments.

In recent years, vehicles, such as automobiles, are equipped with travel control devices for assisting drivers in driving to reduce the load of driving for the drivers and to achieve increased safety. With respect to a travel control device of this kind, there have been developed various technologies (e.g., Japanese Unexamined Patent Application Publication No. 2019-172113) regarding a travel control mode involving performing steering assist control and acceleration-deceleration control assuming that the main driving operation is performed by the driver and a travel control mode (i.e., so-called automated driving mode) in which the vehicle travels automatically without the driving operation by the driver.

Travel control by the travel control device is basically realized with the device having, for example, an adaptive cruise control (ACC) function and an active lane keep centering (ALKC) control function. By performing such travel control, the vehicle can travel automatically along a travel lane while maintaining a certain distance from a vehicle ahead.

Furthermore, by having a locator function, the travel control device can also allow the subject vehicle to travel automatically to a destination. Such automated travel involves appropriately performing various kinds of control, such as lane change control for the subject vehicle, merge control for merging from a branch road, such as a merging lane, into a main road, such as a highway, and branch control for branching off from the main road to a branch road. In these various kinds of control, such as the lane change control, the merge control, and the branch control, it is desirable that nearby vehicles that may become a hindrance to the subject vehicle be recognized in real time. Such nearby vehicles are normally recognized by using an autonomous sensor, such as a camera, a laser radar, and so on.

SUMMARY

An aspect of the disclosure provides a vehicle travel control device including an autonomous sensor, a first travel environment recognizer, a second travel environment recognizer, a main deceleration controller, and a preliminary deceleration controller. The autonomous sensor is configured to detect real space surrounding a subject vehicle. The first travel environment recognizer is configured to recognize first travel environment information comprising road information and traffic information on a surrounding of a subject vehicle on a basis of information acquired by the autonomous sensor. The second travel environment recognizer is configured to recognize second travel environment information comprising road information and traffic information on the surrounding of the subject vehicle. The second travel environment information is acquired as a result of communication with an outside of the subject vehicle. The main deceleration controller is configured to perform main deceleration control with respect to an obstacle when the main deceleration controller determines, on a basis of the first travel environment information, that the subject vehicle is traveling on a branch road merging with a main road and that the obstacle that is to interfere with the subject vehicle at a merging point with the main road at a predicted time point at which the subject vehicle is to reach the merging point exists on the main road. The preliminary deceleration controller is configured to perform preliminary deceleration control with respect to the obstacle prior to the main deceleration control when the preliminary deceleration controller determines, on a basis of the second travel environment information, that the subject vehicle is traveling on the branch road and that the obstacle is to exist at the merging point with the main road at the predicted time point at which the subject vehicle is to reach the main road, and when the obstacle is not recognized yet on the basis of the first travel environment information.

An aspect of the disclosure provides a vehicle travel control device including an autonomous sensor and circuitry. The autonomous sensor is configured to detect real space surrounding a subject vehicle. The circuitry is configured to recognize first travel environment information comprising road information and traffic information surrounding the subject vehicle on a basis of information acquired by the autonomous sensor. The circuitry is configured to recognize second travel environment information comprising the road information and the traffic information surrounding the subject vehicle. The second travel environment information is acquired as a result of communication with an outside of the subject vehicle. The circuitry is configured to perform main deceleration control with respect to an obstacle when the circuitry determines, on a basis of the first travel environment information, that the subject vehicle is traveling on a branch road merging with a main road and that the obstacle that is to interfere with the subject vehicle at a merging point with the main road at a predicted time point at which the subject vehicle is to reach the merging point exists on the main road based. The circuitry is configured to perform preliminary deceleration control with respect to the obstacle prior to the main deceleration control when the circuitry determines, on a basis of the second travel environment information, that the subject vehicle is traveling on the branch road and that the obstacle is to exist at the merging point with the main road at the predicted time point at which the subject vehicle is to reach the main road on the basis of the second travel environment information, and when the obstacle is not recognized yet based on the first travel environment information.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In merge control in which a subject vehicle merges into a main road from a branch road, it is sometimes difficult for an autonomous sensor to recognize a vehicle on the main road until immediately before the subject vehicle reaches a merging point due to the effect of an elevation difference between the main road and the branch road, a sidewall on the side of the road, and so on. In such a case, sudden braking is performed against the vehicle on the main road, possibly bringing discomfort to the vehicle occupant.

It is desirable to provide a vehicle travel control device that can prevent sudden braking against a vehicle existing on a main road and that can achieve discomfort-less merge control.

Figure 1:
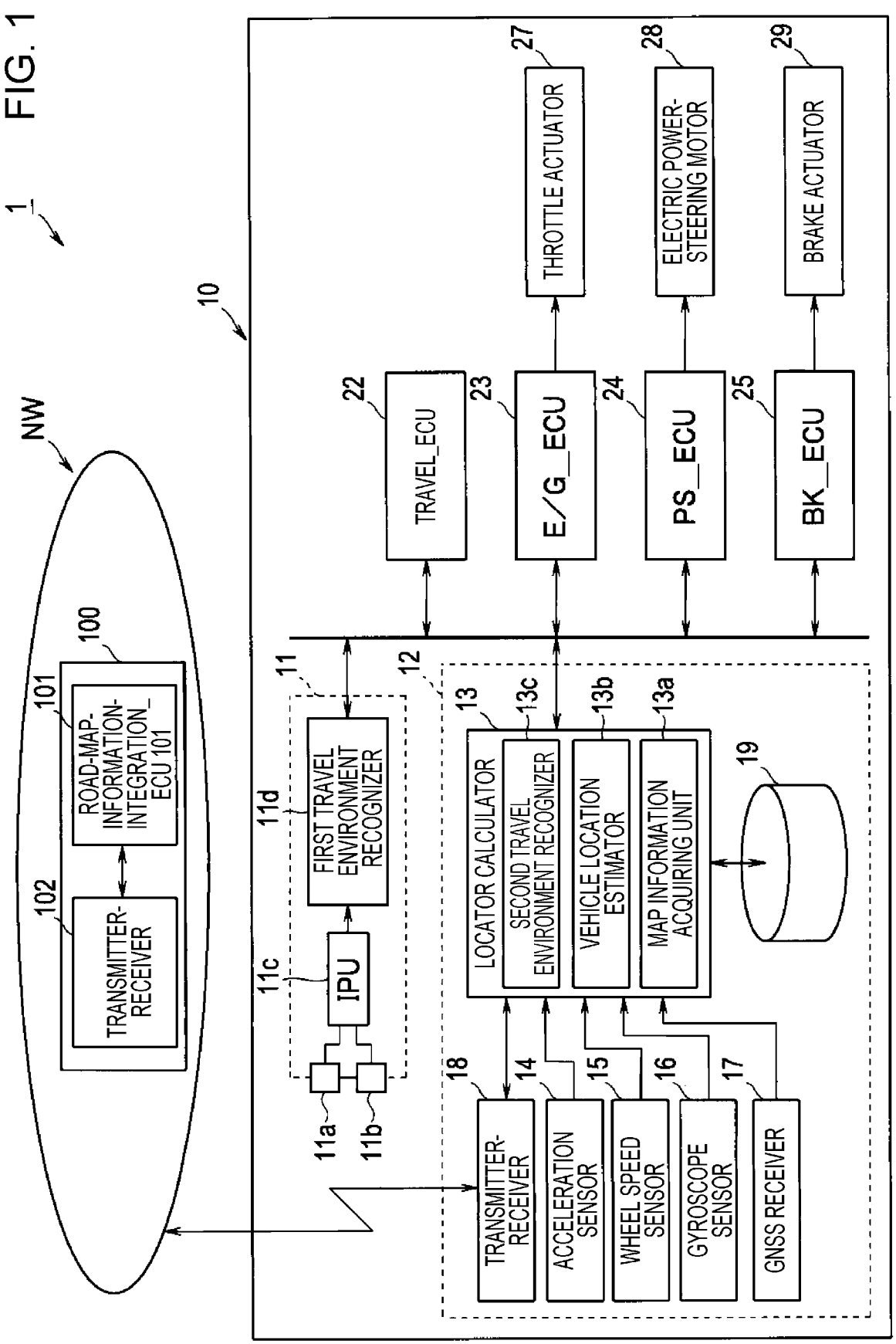
FIG. 1 illustrates the overall configuration of a travel control system.
Figure 2:
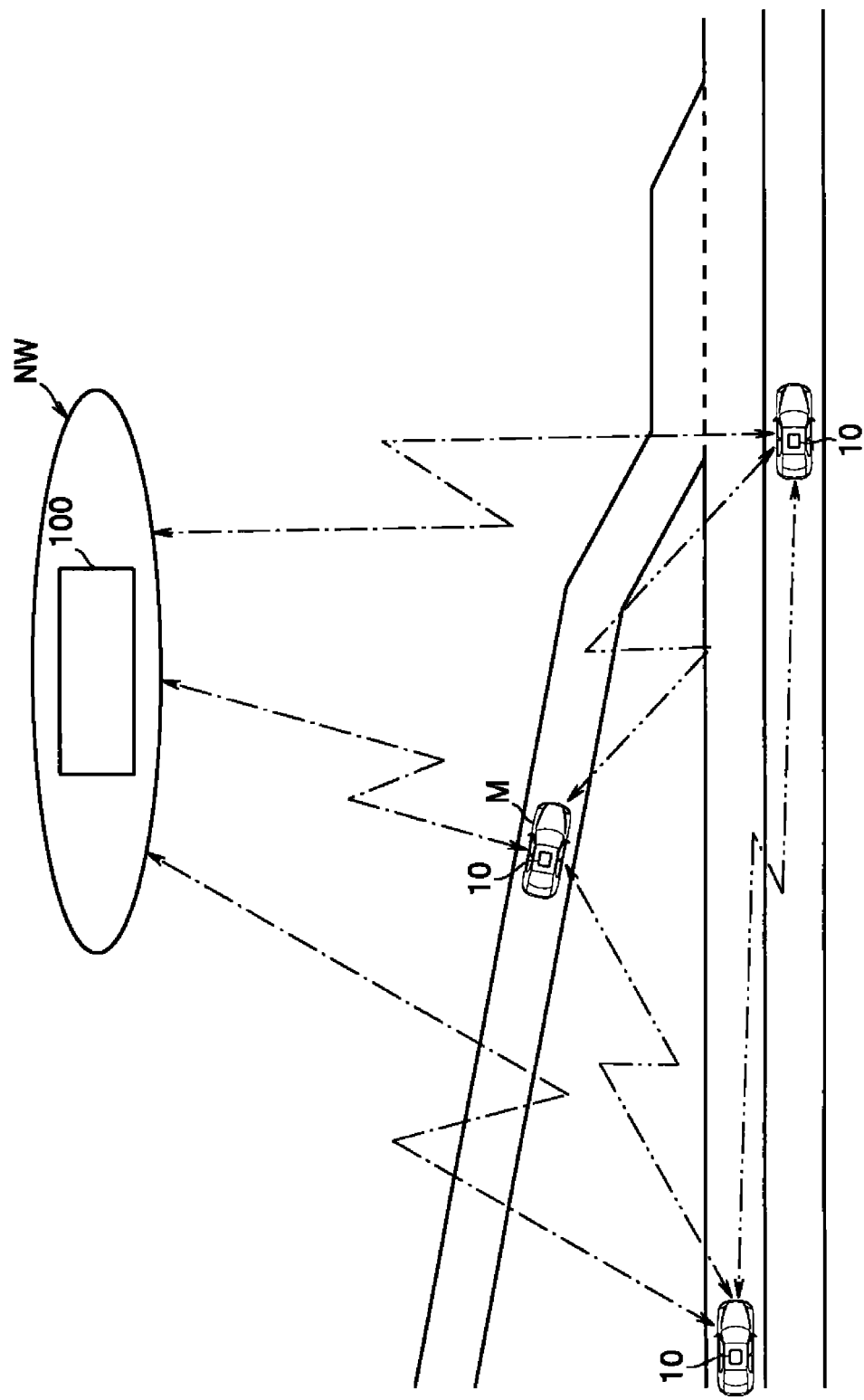
FIG. 2 illustrates road-to-vehicle communication and vehicle-to-vehicle communication.

An embodiment of the disclosure will now be described below with reference to the drawings. The drawings are related to the embodiment of the disclosure, and FIG. 1 illustrates the overall configuration of a travel control system. As illustrated in FIG. 1 and FIG. 2, a travel control system 1 according to this embodiment has travel control devices 10 individually installed in a plurality of vehicles, and a control device 100 provided in a network environment NW to which the plurality of travel control devices 10 are coupled by wireless communication. The control device 100 is provided as, for example, a server device in a cloud-computing-based or edge-computing-based network environment or in a road-incidental-facility-network-based network environment.

The control device 100 successively integrates and updates road map information transmitted from the travel control devices 10 of the individual vehicles, and transmits the updated road map information to the vehicles. In order to achieve this, the control device 100 has a road-map-information-integration_ECU 101 and a transmitter-receiver 102.

The road-map-information-integration_ECU 101 integrates the road map information collected from the plurality of vehicles via the transmitter-receiver 102, and successively updates the road map information surrounding the vehicles on the road. The road map information is constituted of, for example, a dynamic map and has four layers of information, namely, static information and semi-static information mainly constituting road information, and semi-dynamic information and dynamic information mainly constituting traffic information.

The static information is constituted of information that demands an update at least every month, such as information about roads and structures on roads, lane information, road surface information, and permanent regulation information.

The semi-static information is constituted of information that demands an update at least every hour, such as information about a traffic regulation caused by road construction and an event, wide-area weather information, and a traffic-jam prediction.

The semi-dynamic information is constituted of information that demands an update at least every minute, such as information about an actual traffic-jam situation and a travel regulation at an observation time point, information about a temporary traffic obstacle, such as a fallen object and an obstacle, information about an actual accident, and small-area weather information.

The dynamic information is constituted of information that demands an update in units of seconds, such as information transmitted and exchanged between moving objects, information about currently-indicated traffic lights, information about pedestrians and bicycles at intersections, and information about vehicles traveling into intersections.

Such road map information is maintained and updated in cycles until subsequent information is received from each vehicle, and the updated road map information is appropriately transmitted to each vehicle via the transmitter-receiver 102.

Each travel control device 10 has a travel-environment recognition unit 11 and a locator unit 12 as units for recognizing the travel environment outside the vehicle. Furthermore, the travel control device 10 includes a travel control unit (referred to as "travel_ECU" hereinafter) 22, an engine control unit (referred to as "E/G_ECU" hereinafter) 23, a power-steering control unit (referred to as "PS_ECU" hereinafter) 24, and a brake control unit (referred to as "BK_ECU" hereinafter) 25. These control units 22 to 25 are coupled to the travel-environment recognition unit 11 and the locator unit 12 via an in-vehicle communication line, such as a controller area network (CAN).

The travel-environment recognition unit 11 is fixed to, for example, an upper central area at the front of the vehicle cabin. The travel-environment recognition unit 11 has a vehicle-mounted camera (i.e., stereo camera) constituted of a main camera 11a and a sub camera 11b, an image processing unit (IPU) 11c, and a first travel environment recognizer 11d.

The main camera 11a and the sub camera 11b serve as an autonomous sensor that detects the real space surrounding a subject vehicle M, are disposed at, for example, bilaterally-symmetric locations with respect to the center in the vehicle width direction, and capture stereo images of the front environment of the subject vehicle M from different visual points.

The IPU 11c performs predetermined image processing on the image information of the front travel environment of the subject vehicle M captured by the cameras 11a and 11b, so as to generate front-travel-environment image information (distance image information) including distance information determined from the amount of positional displacement of a corresponding target.

Based on, for example, the distance image information received from the IPU 11c, the first travel environment recognizer 11d determines lane boundary lines defining roads surrounding the subject vehicle M. For example, as illustrated in FIG. 2, in a case where the subject vehicle M is traveling on a branch road, such as a ramp way, merging with a main road, such as a highway, the first travel environment recognizer 11d recognizes a lane boundary line serving as a boundary between the branch road and the main road at a merging point C (see FIG. 3 and FIG. 4) therebetween, in addition to the lane boundary lines of the branch road captured by the stereo camera.

Furthermore, the first travel environment recognizer 11d determines the road curvature [1/m] of left and right boundary lines for the travel path (travel lane) of the subject vehicle M, as well as the width (vehicle width) between the left and right boundary lines. Although there are various known methods for determining this road curvature and the vehicle width, for example, the first travel environment recognizer 11d recognizes the left and right boundary lines by performing binarization processing in accordance with a luminance difference based on the front-travel-environment image information, and determines the curvature of the left and right boundary lines as the road curvature for every predetermined segment by using, for example, a curve approximation formula based on the least squares method.

Moreover, the first travel environment recognizer 11d performs predetermined pattern matching on the distance image information so as to recognize three-dimensional objects, such as a guardrail and a curb extending along the road and a vehicle existing on a nearby road of the subject vehicle M. In the recognition of each three-dimensional object by the first travel environment recognizer 11d, for example, the type of the three-dimensional object, the distance to the three-dimensional object, the speed of the three-dimensional object, and the relative speed between the three-dimensional object and the subject vehicle M are recognized.

Accordingly, in this embodiment, the first travel environment recognizer 11d recognizes the first travel environment information containing road information surrounding the subject vehicle M, including the travel path thereof, and traffic information about a running vehicle and a parked vehicle existing on the road. In one embodiment, the first travel environment recognizer 11d may serve as a "first travel environment recognizer" that recognizes first travel environment information based on information acquired by the autonomous sensor.

The autonomous sensor for detecting the travel environment in the travel-environment recognition unit 11 is not limited to a stereo camera, and may be, for example, a monocular camera. Furthermore, a radar device, such as either one of a millimeter wave radar and a laser radar, may be used as an autonomous sensor for detecting the travel environment in place of the stereo camera or together with the stereo camera. Moreover, the travel-environment detection range by the autonomous sensor is extendable to the lateral sides and the rear side of the subject vehicle M.

The locator unit 12 estimates the vehicle location on the road map and has a locator calculator 13 that estimates the vehicle location. The input side of the locator calculator 13 is coupled to various sensors to be used for estimating the location (vehicle location) of the subject vehicle M. Such various sensors include a front-rear acceleration sensor 14 that detects the front-rear acceleration of the subject vehicle M, a wheel speed sensor 15 that detects the rotation speed of the front, rear, left, and right wheels, a gyroscope sensor 16 that detects either one of an angular velocity and angular acceleration of the subject vehicle M, and a global navigation satellite system (GNSS) receiver 17 that receives positioning signals transmitted from a plurality of positioning satellites. The locator calculator 13 is also coupled to a transmitter-receiver 18 for exchanging information (i.e., for performing road-to-vehicle communication: see single-dot chain lines in FIG. 2) with the control device 100 and also for exchanging information (i.e., for performing vehicle-to-vehicle communication: see double-dot chain lines in FIG. 2) with other vehicles.

The locator calculator 13 is coupled to a high-definition road map database 19. The high-definition road map database 19 is a mass storage medium, such as a hard disk drive (HDD), and stores high-definition road map information (dynamic map). As lane data to be used when travel control is to be performed on the subject vehicle M, the high-definition road map information is similar to the road map information to be successively updated in the aforementioned road-map-information-integration_ECU 101 in that the high-definition road map information has four layers of information, namely, static information and semi-static information mainly constituting road information, and semi-dynamic information and dynamic information mainly constituting traffic information.

The locator calculator 13 includes a map information acquiring unit 13a, a vehicle location estimator 13b, and a second travel environment recognizer 13c.

Based on a destination set by the driver for automated driving, the map information acquiring unit 13a acquires route map information from the current location to the destination from the map information stored in the high-definition road map database 19.

Furthermore, the map information acquiring unit 13a transmits the acquired route map information (i.e., lane data on the route map) to the vehicle location estimator 13b. The vehicle location estimator 13b acquires the positional coordinates of the subject vehicle M based on the positioning signals received by the GNSS receiver 17. Moreover, the vehicle location estimator 13b map-matches the acquired positional coordinates on the route map information to estimate the vehicle location on the road map, recognizes the left and right lane boundary lines serving as boundaries for the travel path (travel lane) of the subject vehicle M, and acquires the road curvature at the center of the travel lane stored in the road map data.

Furthermore, in an environment, such as inside a tunnel, where it is difficult to receive an effective positioning signal from a positioning satellite due to low reception sensitivity of the GNSS receiver 17, the vehicle location estimator 13b switches to an autonomous navigation mode involving estimating the vehicle location based on the vehicle speed determined based on the wheel speed detected by the wheel speed sensor 15, the angular velocity detected by the gyroscope sensor 16, and the front-rear acceleration detected by the front-rear acceleration sensor 14, so as to estimate the vehicle location on the road map.

Moreover, when the vehicle location estimator 13b estimates the vehicle location on the road map based on either one of the positioning signal received by the GNSS receiver 17 and the information detected by the gyroscope sensor 16 and so on, the vehicle location estimator 13b determines the road type of the travel path on which the subject vehicle M is currently traveling based on the estimated vehicle location on the road map.

The second travel environment recognizer 13c uses the road map information acquired as a result of the external communication (i.e., road-to-vehicle communication and vehicle-to-vehicle communication) via the transmitter-receiver 18, so as to update the road map information stored in the high-definition road map database 19 to the latest status. In addition to the static information, this update is performed for the semi-static information, the semi-dynamic information, and the dynamic information. Accordingly, the road map information contains road information and traffic information acquired as a result of communication with the outside, and information about a moving object, such as a vehicle, traveling on the road is updated substantially in real time.

The second travel environment recognizer 13c verifies the road map information based on the travel environment information recognized by the travel-environment recognition unit 11, and updates the road map information stored in the high-definition road map database 19 to the latest status. In addition to the static information, this update is performed for the semi-static information, the semi-dynamic information, and the dynamic information. Accordingly, information about a moving object, such as a vehicle, traveling on the road and recognized by the travel-environment recognition unit 11 is updated in real time.

The road map information updated in this manner is transmitted to the control device 100 and to a vehicle in the vicinity of the subject vehicle M by road-to-vehicle communication and vehicle-to-vehicle communication via the transmitter-receiver 18.

Furthermore, in the updated road map information, the second travel environment recognizer 13c recognizes road map information in a set range centered on the vehicle location estimated by the vehicle location estimator 13b as second travel environment information. The range of the second travel environment information to be recognized by the second travel environment recognizer 13c is larger than that of the first travel environment information recognized by the first travel environment recognizer 11d, such that, for example, road map information of a 1 km-radius range centered on the vehicle location is recognized as the second travel environment information. In one embodiment, the second travel environment recognizer 13c may serve as a "second travel environment recognizer" that recognizes second travel environment information including road information and traffic information surrounding the subject vehicle M acquired as a result of communication with the outside of the subject vehicle M.

The first travel environment information recognized by the first travel environment recognizer 11d of the travel-environment recognition unit 11 and the second travel environment information recognized by the second travel environment recognizer 13c of the locator unit 12 are read by the travel_ECU 22. Furthermore, the input side of the travel_ECU 22 is coupled to various switches and sensors. Such various switches and sensors include a mode switch to be used by the driver for switching the automated driving (travel control) between on and off modes, a steering torque sensor that detects steering torque as an amount of driving operation performed by the driver, a brake sensor that detects an amount by which the brake pedal is pressed as an amount of driving operation performed by the driver, an accelerator sensor that detects an amount by which the accelerator pedal is pressed as an amount of driving operation performed by the driver, and a yaw rate sensor that detects a yaw rate acting on the subject vehicle M.

The travel_ECU 22 has driving modes set therein. The set driving modes include a manual driving mode, a first travel control mode and a second travel control mode for performing travel control, and an evacuation mode. These driving modes are switchable in a selectable manner by the travel_ECU 22 based on, for example, the status of an operation performed on the mode switch.

The manual driving mode involves steering performed by the driver. For example, in the manual driving mode, the subject vehicle M travels in accordance with a driving operation, such as a steering operation, an accelerator operation, and a braking operation by the driver.

Likewise, the first travel control mode involves steering performed by the driver. In one example, the first travel control mode is a so-called semi-automatic driving mode that involves causing the subject vehicle M to travel along a target travel path by causing, for example, the E/G_ECU 23, the PS_ECU 24, and the BK_ECU 25 to perform control by mainly combining adaptive cruise control (ACC), active lane keep centering (ALKC) control, and active lane keep bouncing control, where appropriate, while reflecting a driving operation performed by the driver.

The second travel control mode is an automatic driving mode that does not involve a steering operation, an accelerator operation, and a braking operation performed by the driver, but involves causing the subject vehicle M to travel in accordance with a target route (route map information) by causing, for example, the E/G_ECU 23, the PS_ECU 24, and the BK_ECU 25 to perform control by mainly combining adaptive cruise control, active lane keep centering control, and active lane keep bouncing control, where appropriate. Because the subject vehicle M is made to travel along the target route in the second travel control mode, lane change control and merge control are performed, where appropriate. In merge control, the subject vehicle M traveling on a branch road, such as a ramp way (merging lane), merges into a main road, such as a highway. Such merge control involves monitoring an obstacle (e.g., a vehicle) on the main road serving as the merging destination, in addition to monitoring the branch road on which the subject vehicle M is traveling. Then, when it is determined that an obstacle that may interfere with the subject vehicle M at a predicted time point at which the subject vehicle M traveling on the branch road is to reach the main road exists on the main road, the travel_ECU 22 performs deceleration control for avoiding the interference with the obstacle.

The evacuation mode involves automatically stopping the subject vehicle M on a roadside in a case where, for example, the subject vehicle M is not able to continue traveling in the second travel control mode and the driver is not able to take over the driving operation (i.e., in a case where a transition to either one of the manual driving mode and the first travel control mode is not possible).

The output side of the E/G_ECU 23 is coupled to a throttle actuator 27. The throttle actuator 27 opens and closes a throttle valve of an electronically-controlled throttle provided in the throttle body of the engine, and adjusts the intake air flow by opening and closing the throttle valve in accordance with a driving signal from the E/G_ECU 23, thereby generating a desired engine output.

The output side of the PS_ECU 24 is coupled to an electric power-steering motor 28. The electric power-steering motor 28 applies steering torque to a steering mechanism by using a rotational force of a motor. In automated driving, the electric power-steering motor 28 controls the electric power-steering motor 28 in accordance with a driving signal from the PS_ECU 24, so that active lane keep centering (ALKC) control for maintaining the subject vehicle M on the current travel lane and lane change control (i.e., lane change control for passing control) for moving the subject vehicle M to a neighboring lane are executed.

The output side of the BK_ECU 25 is coupled to a brake actuator 29. The brake actuator 29 adjusts the braking hydraulic pressure to be supplied to a brake wheel cylinder provided in each wheel. When the brake actuator 29 is driven in accordance with a driving signal from the BK_ECU 25, each brake wheel cylinder generates a braking force with respect to the corresponding wheel, thereby forcibly decelerating the subject vehicle M.

Next, deceleration control for avoiding interference (such as a collision) with an obstacle during merge control in the second travel control mode will be described in detail.

This deceleration control is basically performed with respect to an obstacle directly recognized in real space by the autonomous sensor of the travel-environment recognition unit 11. In this embodiment, when the travel_ECU 22 determines that the subject vehicle M is traveling on a branch road and that an obstacle that may interfere (collide) with the subject vehicle M at a predicted time point at which the subject vehicle M is to merge into the main road exists on the main road based on the first travel environment information, the travel_ECU 22 performs this deceleration control (i.e., main deceleration control) for avoiding the interference with the obstacle.

However, even in a case where the obstacle serving as a target is not recognized yet by the travel-environment recognition unit 11, if it is determined that the obstacle that may interfere with the subject vehicle M at the predicted time point at which the subject vehicle M is to reach the main road is to exist at the merging point C with the main road based on the second travel environment information, preliminary deceleration control is performed with respect to the obstacle prior to the main deceleration control.

This preliminary deceleration control includes, for example, first preliminary deceleration control that commences immediately after the obstacle is recognized based on the second travel environment information, and second preliminary deceleration control to be performed prior to the deceleration control based on the first travel environment information if it is determined that interference with the obstacle is not avoidable in accordance with the first preliminary deceleration control.

The first preliminary deceleration control involves delaying the predicted time point at which the subject vehicle M is to reach the merging point C with the main road by reducing a vehicle speed V within a range that does not bring discomfort to the vehicle occupant, so as to exclude, for example, another vehicle traveling on the main road from the obstacle.

Figure 3:
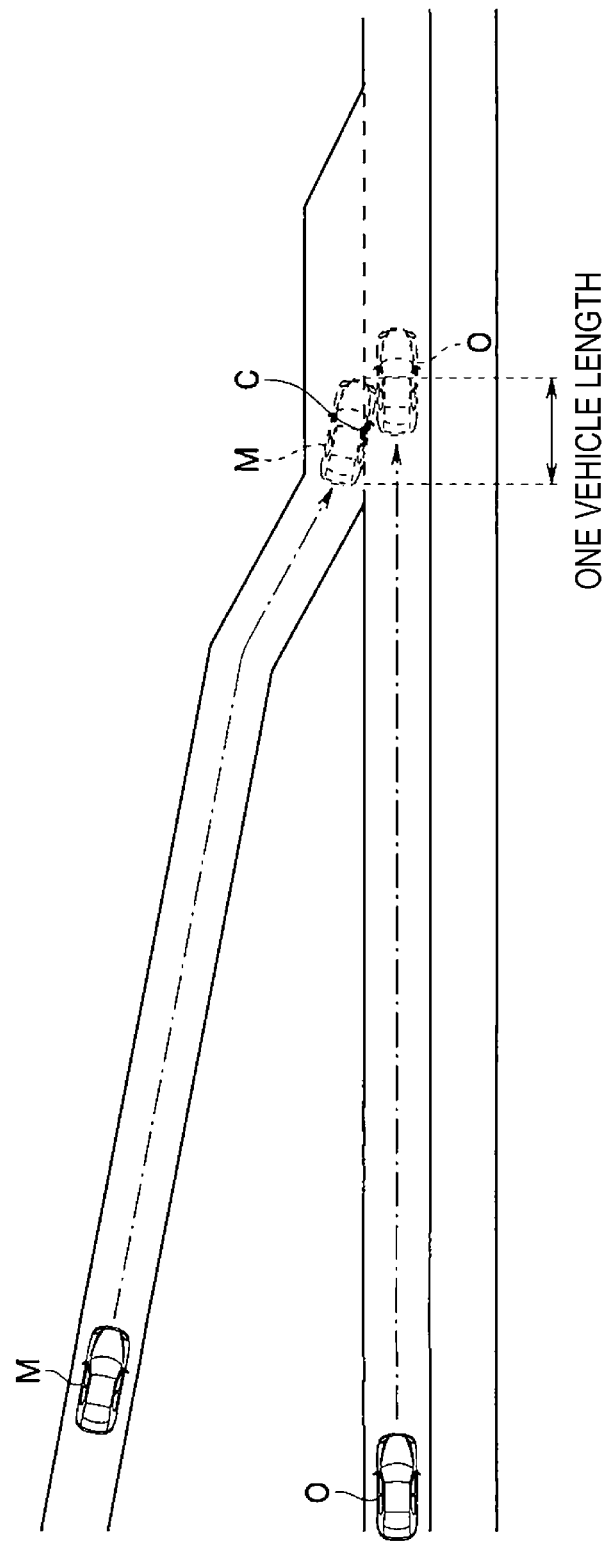
FIG. 3 illustrates an example of interference with another vehicle when a subject vehicle is to merge into a main road.

For example, as illustrated in FIG. 3, in a case where another vehicle O traveling at a predetermined vehicle speed or higher on the main road is to reach the merging point C at the predicted time point at which the subject vehicle M traveling on the branch road is to reach the merging point C with the main road, the vehicle O may possibly become an obstacle that may interfere with the subject vehicle M at the predicted time point. In this embodiment, an obstacle is a three-dimensional object, such as a vehicle, existing on the main road within one-vehicle-length range centered on the merging point C at the predicted time point at which the subject vehicle M is to reach the merging point C.

With regard to such an obstacle, the predicted time point at which the subject vehicle M is to reach the merging point C is delayed by reducing the vehicle speed V for a predetermined time period, so as to allow the vehicle O to pass first, whereby the vehicle O may possibly be excludable from the obstacle.

However, at the start timing of the first preliminary deceleration control, the subject vehicle M is normally sufficiently far from the merging point C with the main road. Thus, at such a timing, it is highly possible that the vehicle occupant has not recognized the obstacle, such as the vehicle O traveling on the main road. When the vehicle speed V is greatly reduced in such a situation, the vehicle occupant may be unable to understand why the subject vehicle M has decelerated and may possibly feel discomfort. Thus, a deceleration range ΔV in the first preliminary deceleration control is limited to a set deceleration range (e.g., 10 km/h) relative to the vehicle speed V at the start of deceleration. Moreover, the deceleration rate at the time of the first preliminary deceleration control is limited to a deceleration rate (e.g., −0.05 G or lower) not physically sensible by the vehicle occupant.

The second preliminary deceleration control involves reducing the vehicle speed V to a target vehicle speed at which the main deceleration control for stopping the subject vehicle M at the merging point C is executable without generating excessive deceleration in a case where it is determined that interference with the obstacle is not avoidable in accordance with the first preliminary deceleration control.

Figure 4:
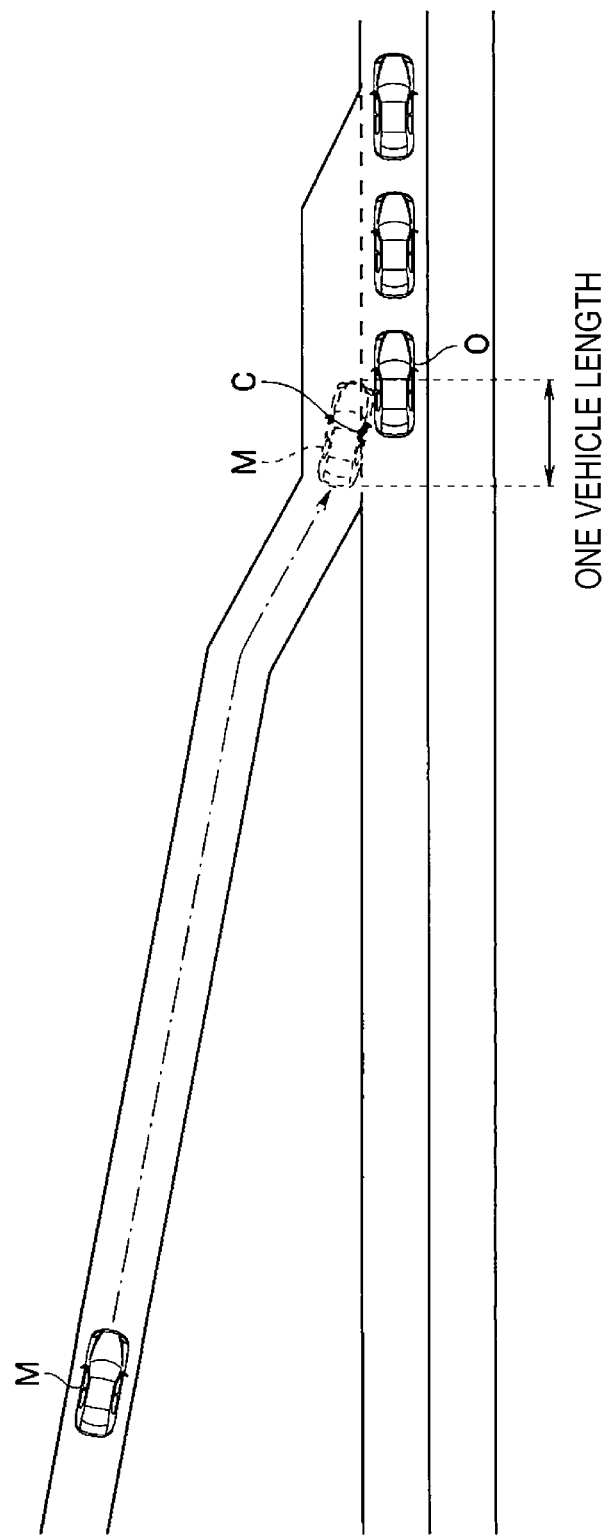
FIG. 4 illustrates another example of interference with another vehicle when the subject vehicle is to merge into the main road.

For example, as illustrated in FIG. 4, if the vehicle O has stopped on the main road in the vicinity of the merging point C or is traveling at a very low speed due to a traffic jam, there is a low possibility that the vehicle O may move significantly from the merging point C at the predicted time point even if the first preliminary deceleration control is performed. In such a case, the vehicle O is not excluded from the obstacle. In order to avoid interference with such an obstacle, it is desirable that the subject vehicle M be stopped just before the obstacle in accordance with the main deceleration control.

On the other hand, when the subject vehicle M is traveling on the branch road, it may be difficult for the travel-environment recognition unit 11 to recognize the vehicle O on the main road until the subject vehicle M reaches a location immediately before the merging point C (e.g., a distance of about 100 m from the merging point C). Even in such a case, the second preliminary deceleration control is performed so as to preliminarily decelerate the subject vehicle M to a vehicle speed at which the subject vehicle M is stoppable just before the obstacle in accordance with the main deceleration control without generating excessive deceleration. In this case, the deceleration rate to be used in the second preliminary deceleration control is desirably more gradual than the deceleration rate to be used in the main deceleration control, and is set to, for example, about −0.1 G.

In one embodiment, the travel_ECU 22 may serve as a "main deceleration controller" and a "preliminary deceleration controller".

Next, deceleration control to be performed when the subject vehicle M is to merge into a main road will be described with reference to a flowchart indicating a merge control routine in FIG. 5. This routine is to be executed repeatedly by the travel_ECU 22 for every set time period. When the routine starts, the travel_ECU 22 checks in step S101 whether the subject vehicle M is traveling on a branch road for merging into a main road.

If the travel_ECU 22 determines in step S101 that the subject vehicle M is not traveling on a branch road, the travel_ECU 22 exits the routine.

In contrast, if the travel_ECU 22 determines in step S101 that the subject vehicle M is traveling on a branch road, the travel_ECU 22 proceeds to step S102 to check whether there is a main road merging with the branch road in front of the branch road based on second travel environment information.

If the travel_ECU 22 determines in step S102 that there is no main road, the travel_ECU 22 exits the routine.

In contrast, if the travel_ECU 22 determines in step S102 that there is a main road, the travel_ECU 22 proceeds to step S103 to check whether an obstacle, such as another vehicle O, that may interfere with the subject vehicle M is already recognized on the main road based on the second travel environment information.

If the travel_ECU 22 determines in step S103 that an obstacle based on the second travel environment information is already recognized, the travel_ECU 22 proceeds to step S105.

In contrast, if the travel_ECU 22 determines in step S103 that an obstacle based on the second travel environment information is not recognized, the travel_ECU 22 proceeds to step S104 to check whether an obstacle based on the second travel environment information exists on the main road.

In the determination process in step S104, the travel_ECU 22 calculates a predicted time point at which the subject vehicle M is to reach the merging point C with the main road when the subject vehicle M travels at the current vehicle speed V. Moreover, the travel_ECU 22 checks whether any of three-dimensional objects, such as the vehicle O, recognized on the main road based on the second travel environment information is to exist at the merging point C at the predicted time point. Then, if a three-dimensional object is to exist at the merging point C at the predicted time point, the travel_ECU 22 recognizes the three-dimensional object as an obstacle that may interfere with the subject vehicle M.

If the determination result in step S104 indicates that there is no obstacle based on the second travel environment information, the travel_ECU 22 proceeds to step S108.

In contrast, if the determination result in step S104 indicates that there is an obstacle based on the second travel environment information, the travel_ECU 22 proceeds to step S105 to check whether the three-dimensional object recognized as an obstacle in step S104 satisfies a condition for excluding the three-dimensional object from the obstacle in step S107 to be described later.

If the travel_ECU 22 determines in step S105 that the condition for excluding the three-dimensional object from the obstacle is satisfied, the travel_ECU 22 proceeds to step S108.

In contrast, if the travel_ECU 22 determines in step S105 that the condition for excluding the three-dimensional object from the obstacle is not satisfied, the travel_ECU 22 proceeds to step S106 to check whether a distance L from the subject vehicle M to the merging point C is smaller than a predetermined distance threshold value L1. The distance threshold value L1 is a fixed value set in advance, and is set to, for example, 200 m.

If the travel_ECU 22 determines in step S106 that the distance L to the merging point C is smaller than the threshold value L1, the travel_ECU 22 proceeds to step S109.

In contrast, if the travel_ECU 22 determines in step S106 that the distance L to the merging point C is larger than or equal to the threshold value L1, the travel_ECU 22 proceeds to step S107 to perform first preliminary deceleration control with respect to the obstacle, and subsequently exits the routine.

Figure 6:
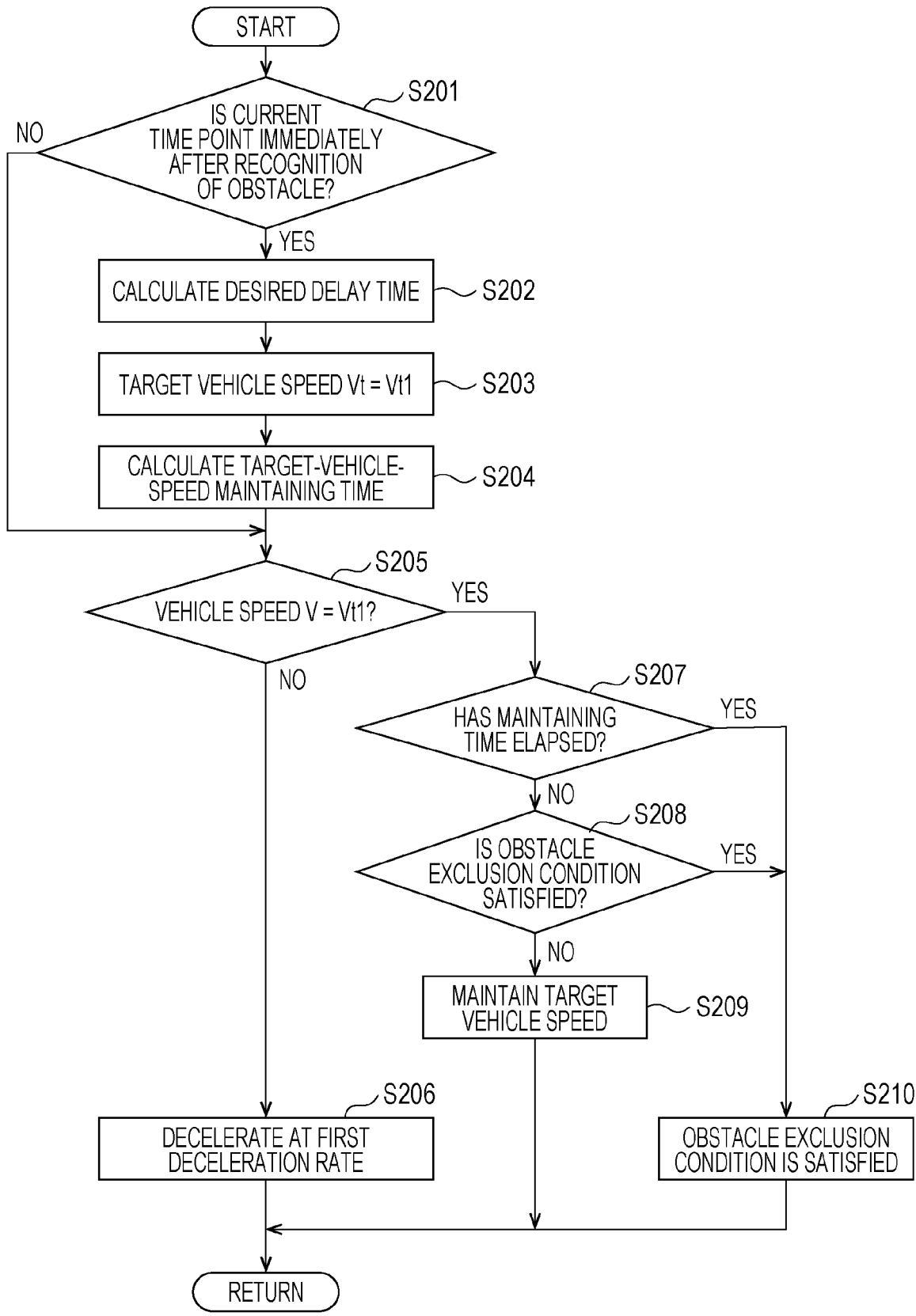
FIG. 6 is a flowchart illustrating a first preliminary deceleration control subroutine.

For example, the first preliminary deceleration control is performed in accordance with a flowchart of a first preliminary deceleration control subroutine illustrated in FIG. 6. In one example, when the subroutine starts, the travel_ECU 22 checks in step S201 whether the current time point is immediately after the recognition of the obstacle based on the second travel environment information.

If the travel_ECU 22 determines in step S201 that the current time point is not immediately after the recognition of the obstacle based on the second travel environment information, the travel_ECU 22 proceeds to step S205.

In contrast, if the travel_ECU 22 determines in step S201 that the current time point is immediately after the recognition of the obstacle based on the second travel environment information, the travel_ECU 22 proceeds to step S202. Then, the travel_ECU 22 calculates a delay time (desired delay time) by which the predicted time point at which the subject vehicle M is to reach the merging point C is to be delayed for avoiding a collision between the subject vehicle M and the obstacle. In one example, based on the moving speed of the obstacle, the travel_ECU 22 calculates a time to be used for causing the obstacle to travel by one vehicle length as a desired delay time relative to the predicted time point.

In step S203, the travel_ECU 22 sets a target vehicle speed Vt1 for changing the current vehicle speed V toward the lower speed side within a set variation range. A set variation range is a vehicle-speed variation range that does not bring discomfort to the vehicle occupant, and is set to, for example, 10 km/h. This target vehicle speed Vt1 is set to, for example, a value that varies in accordance with the current distance L from the subject vehicle M to the merging point C. For example, if the distance L is 500 m or larger, a value obtained by subtracting 5 km/h from the current vehicle speed V is set as the target vehicle speed Vt1. If the distance L is smaller than 500 m, a value obtained by subtracting 10 km/h from the current vehicle speed V is set as the target vehicle speed Vt1.

In step S204, the travel_ECU 22 calculates a time (target-vehicle-speed maintaining time) desired for delaying the predicted time point by the desired delay time while maintaining the target vehicle speed Vt1, and subsequently proceeds to step S205. If the obstacle is, for example, a vehicle stopped at the merging point C, the target-vehicle-speed maintaining time is infinite.

When the travel_ECU 22 proceeds to step S205 from either one of step S201 and step S204, the travel_ECU 22 checks whether the current vehicle speed V has been reduced to the target vehicle speed Vt1.

Then, if the travel_ECU 22 determines in step S205 that the vehicle speed V has not been reduced to the target vehicle speed Vt1 yet, the travel_ECU 22 proceeds to step S206 to reduce the vehicle speed V at a predetermined first deceleration rate (e.g., −0.05 G), and subsequently exits the subroutine.

In contrast, if the travel_ECU 22 determines in step S205 that the vehicle speed V has been reduced to the target vehicle speed Vt1, the travel_ECU 22 proceeds to step S207 to check whether the target-vehicle-speed maintaining time has elapsed from when the vehicle speed V has reached the target vehicle speed Vt1.

Then, if the travel_ECU 22 determines in step S207 that the target-vehicle-speed maintaining time has elapsed, the travel_ECU 22 proceeds to step S210.

In contrast, if the travel_ECU 22 determines in step S207 that the target-vehicle-speed maintaining time has not elapsed yet, the travel_ECU 22 proceeds to step S208 to check whether the condition for excluding the three-dimensional object currently identified as an obstacle from the obstacle is satisfied. In one example, even in a case where the target-vehicle-speed maintaining time has not elapsed, for example, if the three-dimensional object identified as an obstacle accelerates significantly, the three-dimensional object can be excluded from the obstacle without having to wait for the target-vehicle-speed maintaining time to pass. Then, the travel_ECU 22 checks whether the obstacle exclusion condition is satisfied in accordance with the acceleration of the three-dimensional object acting as an obstacle.

Then, if the travel_ECU 22 determines in step S208 that the obstacle exclusion condition is satisfied, the travel_ECU 22 proceeds to step S210.

In contrast, if the travel_ECU 22 determines in step S208 that the obstacle exclusion condition is not satisfied, the travel_ECU 22 proceeds to step S209 to maintain the target vehicle speed Vt1, and exits the subroutine.

When the travel_ECU 22 proceeds to step S210 from either one of step S207 and step S208, the travel_ECU 22 determines that the condition for excluding the three-dimensional object currently identified as an obstacle from the obstacle is satisfied, and exits the subroutine. In one example, the predicted time point at which the subject vehicle M is to reach the merging point C is delayed by a time substantially equivalent to one vehicle length's worth of distance traveled by the obstacle due to the lapse of the target-vehicle-speed maintaining time from when the vehicle speed V reaches the target vehicle speed Vt1 or due to the acceleration of the obstacle. This delay reduces the possibility of interference of the currently-recognized obstacle with the subject vehicle M at the merging point C. Thus, the travel_ECU 22 determines that the three-dimensional object currently identified as an obstacle is excludable from the obstacle.

When the travel_ECU 22 proceeds to step S108 from either one of step S104 and step S105 in the main routine in FIG. 5, the travel_ECU 22 performs vehicle speed control for setting a set vehicle speed (e.g., a set vehicle speed for the ACC) Vt0 as a target vehicle speed, and subsequently exits the routine.

Figure 7:
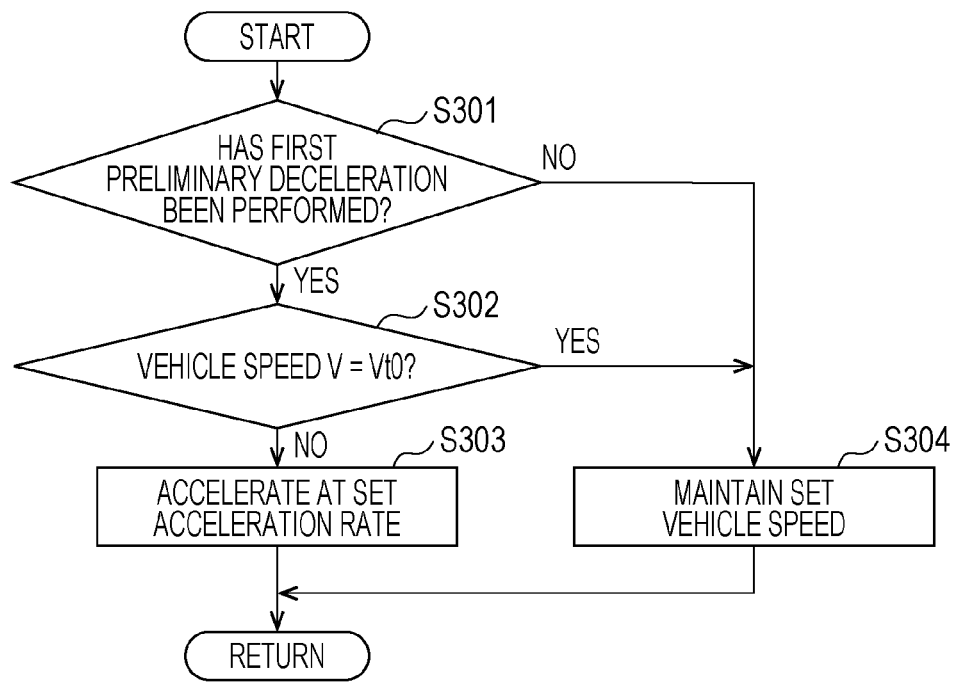
FIG. 7 is a flowchart illustrating a vehicle speed control subroutine with respect to a set vehicle speed.

For example, this vehicle speed control is performed in accordance with a flowchart of a vehicle speed control subroutine illustrated in FIG. 7. When the subroutine starts, the travel_ECU 22 checks in step S301 whether the vehicle speed V has been reduced in the past in accordance with first preliminary deceleration.

Then, if the travel_ECU 22 determines in step S301 that first preliminary deceleration has not been performed, the travel_ECU 22 proceeds to step S304.

In contrast, if the travel_ECU 22 determines in step S301 that first preliminary deceleration has been performed, the travel_ECU 22 proceeds to step S302 to check whether the current vehicle speed V has reached the set vehicle speed Vt0.

Then, if the travel_ECU 22 determines in step S302 that the vehicle speed V has reached the set vehicle speed Vt0, the travel_ECU 22 proceeds to step S304.

In contrast, if the travel_ECU 22 determines in step S302 that the vehicle speed V has not reached the set vehicle speed Vt0, the travel_ECU 22 proceeds to step S303 to increase the vehicle speed V at a predetermined acceleration rate (e.g., 0.1 G), and subsequently exits the subroutine.

When the travel_ECU 22 proceeds to step S304 from either one of step S301 and step S302, the travel_ECU 22 maintains the vehicle speed V at the set vehicle speed Vt0, and exits the subroutine.

Figure 5:
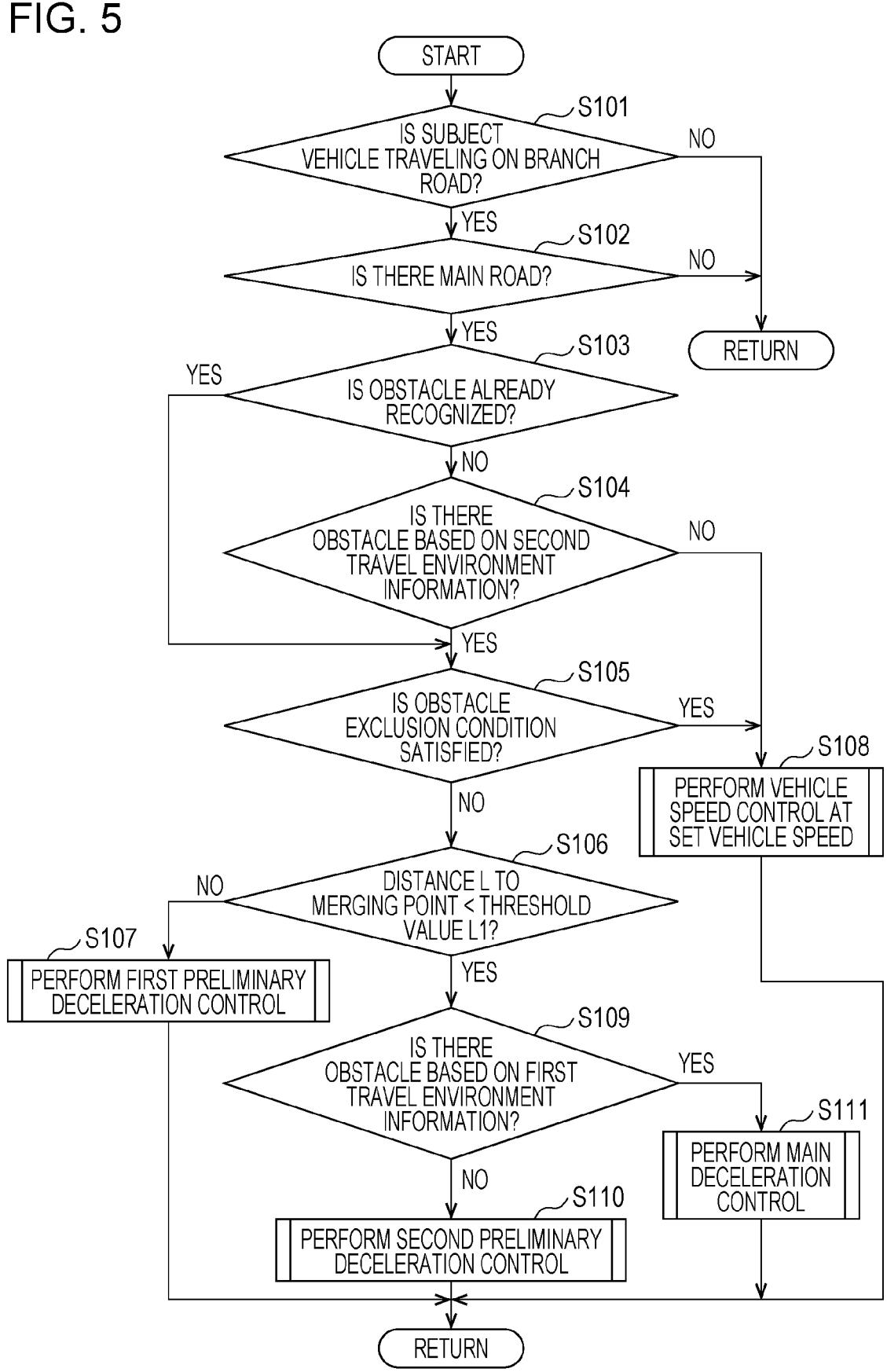
FIG. 5 is a flowchart illustrating a deceleration control routine when the subject vehicle is to merge into the main road.

Furthermore, when the travel_ECU 22 proceeds to step S109 from step S106 in the main routine in FIG. 5, the travel_ECU 22 checks whether an obstacle based on first travel environment information exists on the main road.

In one example, in the determination process in step S109, the travel_ECU 22 calculates a predicted time point at which the subject vehicle M is to reach the merging point C with the main road when the subject vehicle M travels at the current vehicle speed V. Moreover, if the travel_ECU 22 has recognized three-dimensional objects, such as the vehicle O, on the main road based on the first travel environment information, the travel_ECU 22 checks whether any of these three-dimensional objects is to exist at the merging point C at the predicted time point. Then, if a three-dimensional object is to exist at the merging point C at the predicted time point, the travel_ECU 22 recognizes the three-dimensional object as an obstacle that may interfere with the subject vehicle M.

If the determination result in step S109 indicates that there is no obstacle based on the first travel environment information (i.e., if an obstacle is recognized at the merging point C based on the second travel environment information alone), the travel_ECU 22 proceeds to step S110. If there is an obstacle based on the first travel environment information (i.e., if an obstacle is recognized at the merging point C based on the first travel environment information and the second travel environment information), the travel_ECU 22 proceeds to step S111.

When the travel_ECU 22 proceeds to step S110 from step S109, the travel_ECU 22 performs second preliminary deceleration control, and subsequently exits the routine.

Figure 8:
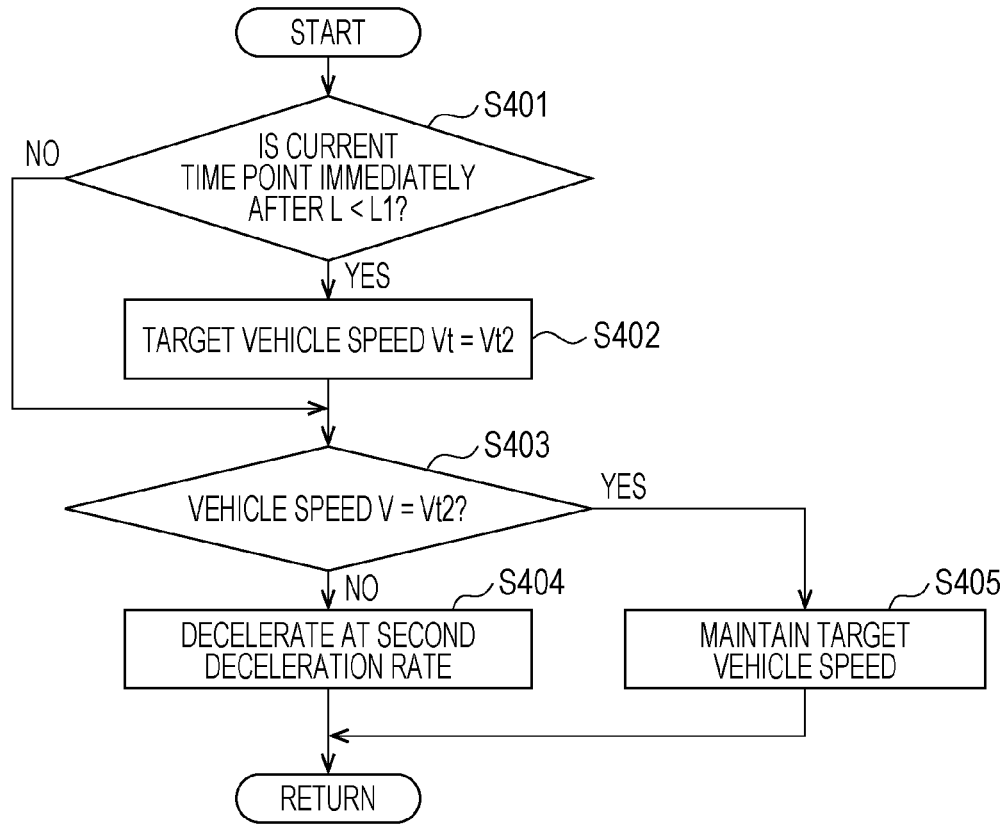
FIG. 8 is a flowchart illustrating a second preliminary deceleration control subroutine.

For example, this second preliminary deceleration control is performed in accordance with a flowchart indicating a second preliminary deceleration control subroutine illustrated in FIG. 8. When the subroutine starts, the travel_ECU 22 checks in step S401 whether the current time point is immediately after a time point at which the distance L to the merging point C has become smaller than the predetermined threshold value L1 (e.g., L1=200 m).

Then, if the travel_ECU 22 determines in step s401 that the current time point is not immediately after the time point at which the distance L has become smaller than the threshold value L1, the travel_ECU 22 proceeds to step S403.

In contrast, if the travel_ECU 22 determines in step s401 that the current time point is immediately after the time point at which the distance L has become smaller than the threshold value L1, the travel_ECU 22 proceeds to step S402 to set a target vehicle speed Vt2 for the second preliminary deceleration control.

This target vehicle speed Vt2 may be a fixed value, but is desirably, for example, variable in accordance with the first travel environment information. For example, in a case where the weather is fine and the boundary line serving as a boundary between the branch road and the main road is recognized, the target vehicle speed Vt2 is set to a vehicle speed at which the subject vehicle M is stoppable at the merging point C when the subject vehicle M starts decelerating at a deceleration rate of −0.3 G from 100 m before the merging point C. Furthermore, for example, in a case where the weather is fine and the boundary line serving as a boundary between the branch road and the main road is not recognized, the target vehicle speed Vt2 is set to a vehicle speed at which the subject vehicle M is stoppable at the merging point C when the subject vehicle M starts decelerating at a deceleration rate of −0.27 G from 100 m before the merging point C. Moreover, for example, in a case where the weather is poor and the boundary line serving as a boundary between the branch road and the main road is recognized, the target vehicle speed Vt2 is set to a vehicle speed at which the subject vehicle M is stoppable at the merging point C when the subject vehicle M starts decelerating at a deceleration rate of −0.25 G from 100 m before the merging point C. Furthermore, for example, in a case where the weather is poor and the boundary line serving as a boundary between the branch road and the main road is not recognized, the target vehicle speed Vt2 is set to a vehicle speed at which the subject vehicle M is stoppable at the merging point C when the subject vehicle M starts decelerating at a deceleration rate of −0.2 G from 100 m before the merging point C.

When the travel_ECU 22 proceeds to step S403 from either one of step S401 and step S402, the travel_ECU 22 checks whether the vehicle speed V has reached the target vehicle speed Vt2.

Then, if the travel_ECU 22 determines in step S403 that the vehicle speed V has not reached the target vehicle speed Vt2, the travel_ECU 22 performs deceleration at a predetermined second deceleration rate (e.g., −0.1 G), and subsequently exits the subroutine.

In contrast, if the travel_ECU 22 determines in step S403 that the vehicle speed V has reached the target vehicle speed Vt2, the travel_ECU 22 proceeds to step S405 to maintain the target vehicle speed Vt2, and exits the subroutine.

When the travel_ECU 22 proceeds to step S111 from step S109 in the main routine in FIG. 5, the travel_ECU 22 performs main deceleration control with respect to the obstacle, and subsequently exits the routine. In one example, the travel_ECU 22 performs deceleration control for stopping the subject vehicle M before the obstacle existing at the merging point C in step S111, and subsequently exits the routine.

According to this embodiment, the travel control device 10 recognizes first travel environment information based on information acquired by the autonomous sensor in the travel-environment recognition unit 11, recognizes second travel environment information including information acquired by the locator unit 12 communicating with the outside, performs main deceleration control with respect to an obstacle if the travel control device 10 determines that the subject vehicle M is traveling on a branch road and the obstacle is to exist at the merging point C at a predicted time point based on the first travel environment information, and performs preliminary deceleration control with respect to the obstacle prior to the main deceleration control if the travel control device 10 determines that the obstacle is to exist at the merging point C at the predicted time point based on the second travel environment information, thereby preventing sudden braking against a vehicle existing on the main road and achieving discomfort-less merge control.

Figure 9:
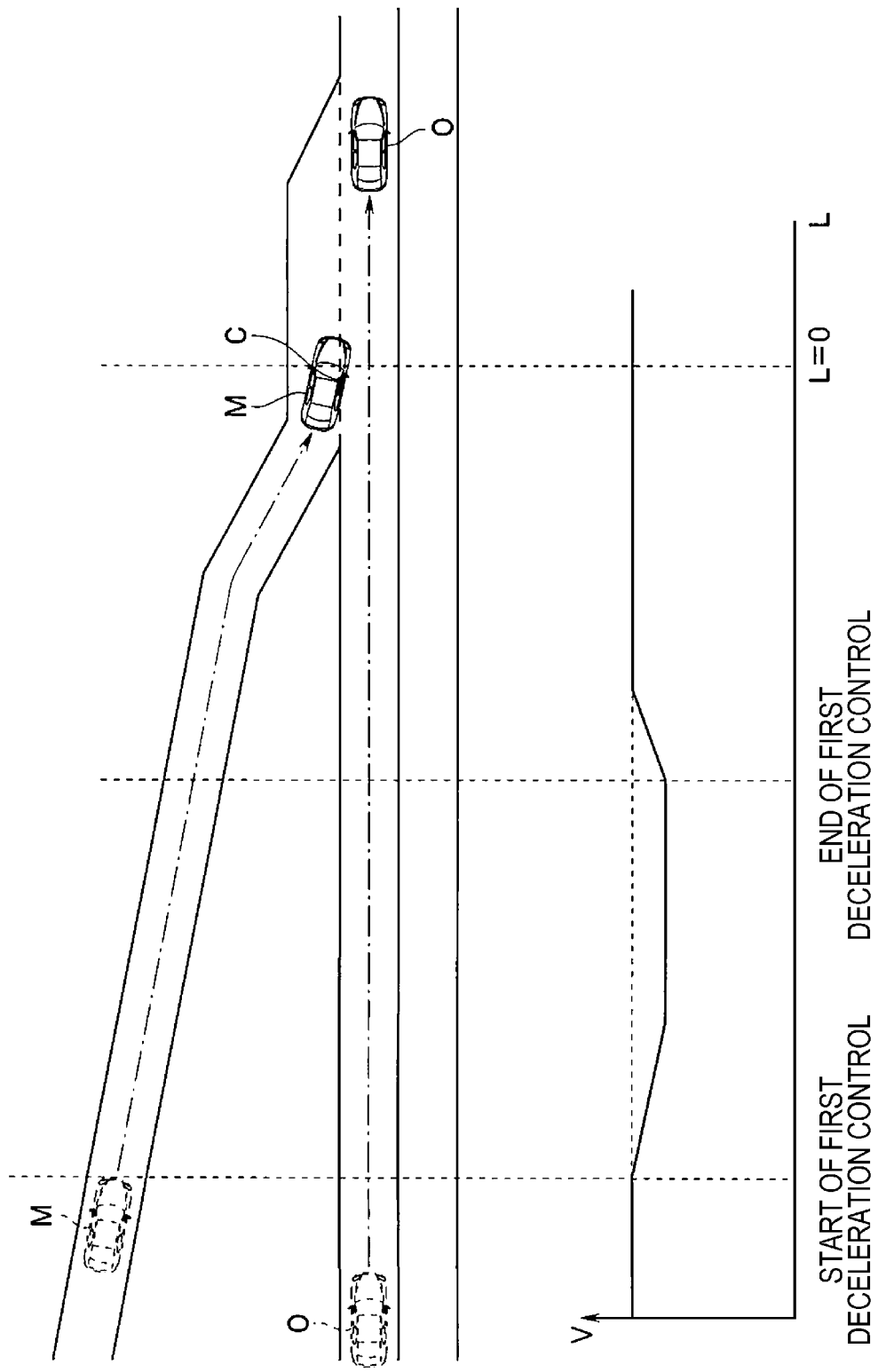
FIG. 9 illustrates an example of the relationship between the subject vehicle controlled in accordance with vehicle speed control and another vehicle.

For example, as illustrated in FIG. 9, in a case where another vehicle O that may become an obstacle is traveling on the main road at a predetermined vehicle speed or higher, the predicted time point is delayed in accordance with first preliminary deceleration control, so that the subject vehicle M passes the merging point C after the vehicle O passes the merging point C. In this case, the first preliminary deceleration control is performed with respect to the obstacle recognized based on the second travel environment information prior to the recognition of the obstacle based on the first travel environment information, and the variation range of the vehicle speed to be controlled in accordance with the first preliminary deceleration control is limited to a set range. Therefore, deceleration control is performed without bringing discomfort to the vehicle occupant, whereby interference with the obstacle at the merging point C can be avoided.

Figure 10:
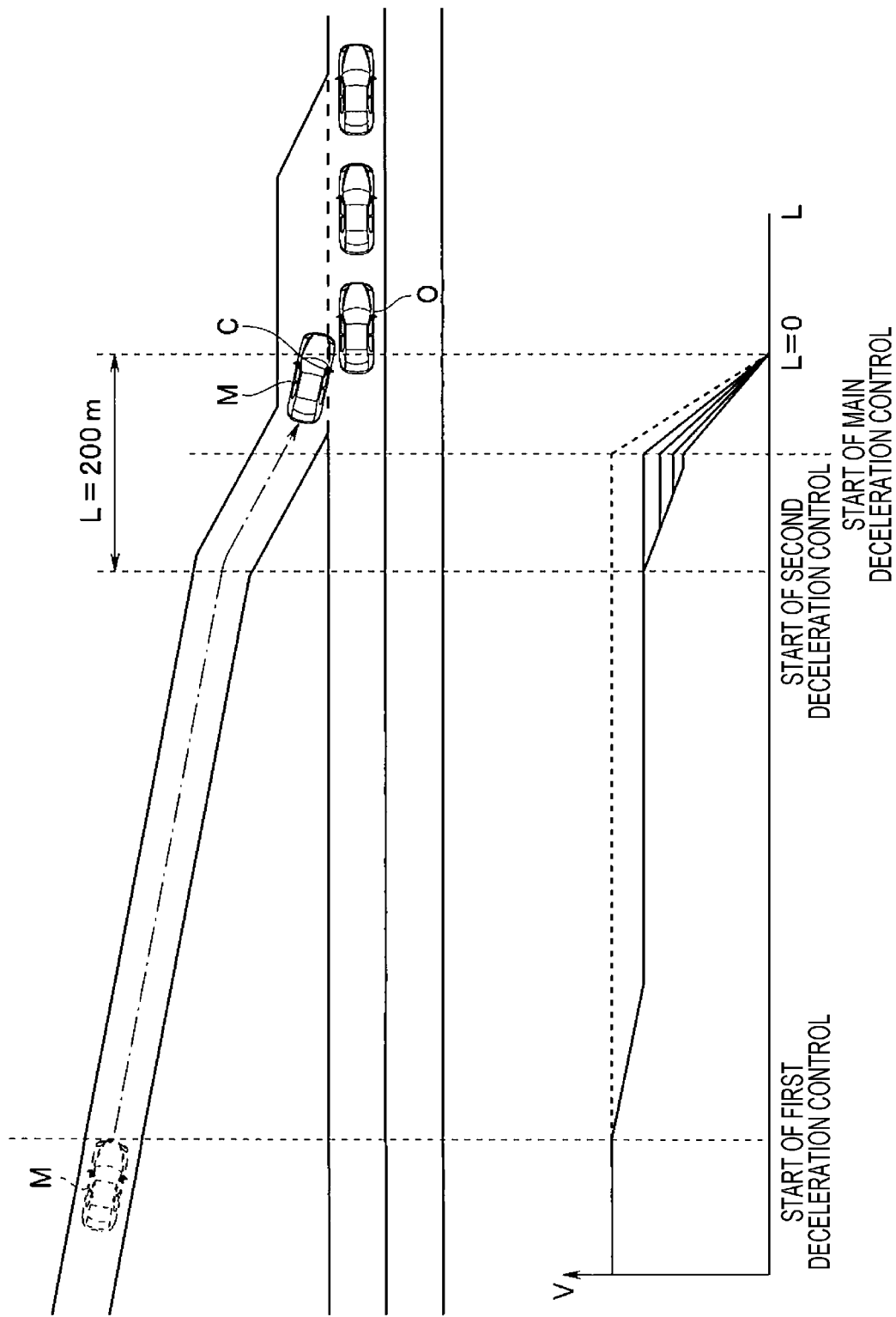
FIG. 10 illustrates another example of the relationship between the subject vehicle controlled in accordance with vehicle speed control and another vehicle.

Furthermore, for example, as illustrated in FIG. 10, in a case where another vehicle O that may become an obstacle is stopped or is traveling at a very low speed, the subject vehicle M is preliminarily decelerated in accordance with either one of the first preliminary deceleration control and the second preliminary deceleration control, so that when the subject vehicle M recognizes the obstacle based on the first travel environment information, the subject vehicle M undergoes the main deceleration control at a reasonable deceleration rate and can thus be stopped at the merging point C.

In the above-described embodiment, the travel-environment recognition unit 11, the locator unit 12, the travel_ECU 22, the E/G_ECU 23, the PS_ECU 24, the BK_ECU 25, and the road-map-information-integration_ECU 101 are each constituted of, for example, a known microcomputer including a central processing unit (CPU), a random access memory (RAM), a read only memory (ROM), and a non-volatile storage unit, and peripheral devices thereof. A program to be executed by the CPU and fixed data, such as a data table, are preliminarily stored in the ROM. The functions of each processor may entirely or partially be constituted of either one of a logic circuit and an analog circuit, and the process of each of the various kinds of programs may be realized by an electronic circuit, such as a field programmable gate array (FPGA).

The above embodiment of the disclosure is not limited thereto and permits other various modifications so long as they do not depart from the scope of the disclosure in the practical phase. For example, in the above-described embodiment, the determination processes from step S103 to step S105 illustrated in FIG. 5 may be performed in the control device 100. In this case, for example, with respect to vehicles existing in an area managed by each control device 100, the road-map-information-integration_ECU 101 checks whether there is a merging point before a travel path of each vehicle based on the road map information. Then, with regard to a vehicle traveling on a travel path having a merging point ahead, it is determined whether there is an obstacle that may interfere with the vehicle at a predicted time point at which the vehicle is to reach the merging point. This determination result may be receivable by the transmitter-receiver 18 of the subject vehicle M as, for example, auxiliary information of the dynamic information in the road map information. In this case, in the above-described flowchart illustrated in FIG. 5, the travel_ECU 22 checks whether there is an obstacle that may interfere with the subject vehicle M at the predicted time point based on the information received from the control device 100, instead of performing the determination processes in step S103 to step S105. Then, if the travel_ECU 22 determines that there is an obstacle, the travel_ECU 22 may proceed to step S106. If the travel_ECU 22 determines that there is no obstacle, the travel_ECU 22 may proceed to step S108.

Furthermore, even when some elements are deleted from all the elements indicated in the above-described embodiment, if the problems to be solved by the disclosure can be solved and the advantageous effects of the disclosure can be achieved, the configuration with these deleted elements may be extracted as an embodiment of the disclosure.

The travel control device 10 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the travel control device 10 including the travel-environment recognition unit 11, the locator unit 12, the travel_ECU 22, the E/G_ECU 23, the PS_ECU 24, the BK_ECU 25, the throttle actuator 27, the electric power-steering motor 28, and the brake actuator 29. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle travel control device comprising:
an autonomous sensor configured to detect real space surrounding a subject vehicle;
a first travel environment recognizer configured to recognize first travel environment information comprising road information and traffic information on a surrounding of the subject vehicle on a basis of information acquired by the autonomous sensor;
a second travel environment recognizer configured to recognize second travel environment information comprising road information and traffic information on the surrounding of the subject vehicle, the second travel environment information being acquired as a result of performing external communication;
a deceleration controller configured to:
determine that the subject vehicle is traveling on a branch road merging with a main road;
in response to determining that the subject vehicle is traveling on the branch road, determine, based on the second travel environment information, presence of an obstacle which interferes with the subject vehicle at a merging point with the main road, considering a first predicted arrival time of the subject vehicle at the merging point;
in response to determining the presence of the obstacle based on the second travel environment information, determine that a distance between the subject vehicle and the merging point exceeds a threshold distance;
in response to determining that the distance exceeds the threshold distance, perform a first preliminary deceleration control to delay the first predicted arrival time by reducing a vehicle speed to a first target speed;
in response to determining that the distance does not exceed the threshold distance, determine, based on the first travel environment information, presence of the obstacle which interferes with the subject vehicle at the merging point with the main road, considering a second predicted arrival time of the subject vehicle at the merging point;
in response to not determining the presence of the obstacle based on the first travel environment information, perform a second preliminary deceleration control to delay the second predicted arrival time by reducing the vehicle speed to a second target speed different from the first target speed; and
in response to determining the presence of the obstacle based on the first travel environment information, perform a main deceleration control to reduce the vehicle speed to a third target vehicle speed for stopping the subject vehicle before the obstacle existing at the merging point.

2. The vehicle travel control device according to claim 1, wherein the first target vehicle speed is variable within a predetermined range in accordance with the distance between the subject vehicle and the merging point, and
wherein the second target vehicle speed is variable in accordance with the first travel environment information.

3. The vehicle travel control device according to claim 1, wherein the external communication includes one or both of communication with an externally-disposed control device and communication with another vehicle.

4. The vehicle travel control device according to claim 2, wherein the external communication includes one or both of communication with an externally-disposed control device and communication with another vehicle.

5. A vehicle travel control device comprising:
an autonomous sensor configured to detect real space surrounding a subject vehicle; and
circuitry configured to:
recognize first travel environment information comprising road information and traffic information on a surrounding of the subject vehicle on a basis of information acquired by the autonomous sensor;
recognize second travel environment information comprising road information and traffic information on the surrounding of the subject vehicle, the second travel environment information being acquired as a result of performing external communication;
determine that the subject vehicle is traveling on a branch road merging with a main road;
in response to determining that the subject vehicle is traveling on the branch road, determine, based on the second travel environment information, presence of an obstacle which interferes with the subject vehicle at a merging point with the main road, considering a first predicted arrival time of the subject vehicle at the merging point;
in response to determining the presence of the obstacle based on the second travel environment information, determine that a distance between the subject vehicle and the merging point exceeds a threshold distance;
in response to determining that the distance exceeds the threshold distance, perform a first preliminary deceleration control to delay the first predicted arrival time by reducing a vehicle speed to a first target speed;
in response to determining that the distance does not exceed the threshold distance, determine, based on the first travel environment information, presence of the obstacle which interferes with the subject vehicle at the merging point with the main road, considering a second predicted arrival time of the subject vehicle at the merging point;
in response to not determining the presence of the obstacle based on the first travel environment information, perform a second preliminary deceleration control to delay the second predicted arrival time by reducing the vehicle speed to a second target speed different from the first target speed; and
in response to determining the presence of the obstacle based on the first travel environment information, perform a main deceleration control to reduce the vehicle speed to a third target vehicle speed for stopping the subject vehicle before the obstacle existing at the merging point.

* * * * *